United States Patent [19]

List et al.

[11] 4,207,843

[45] Jun. 17, 1980

[54] COMPRESSION IGNITION DIRECT INJECTION INTERNAL COMBUSTION ENGINE

[75] Inventors: Hans List, 126, Heinrichstrasse; Siegfried Pachernegg; Bruno Schukoff, all of Graz, Austria

[73] Assignee: Hans List, Graz, Austria

[21] Appl. No.: 898,699

[22] Filed: Apr. 21, 1978

[30] Foreign Application Priority Data

Apr. 29, 1977 [AT] Austria ................................. 3071/77
Jan. 13, 1978 [AT] Austria ................................... 263/78
Mar. 13, 1978 [AT] Austria ................................. 1792/78

[51] Int. Cl.² ........................................... F02B 19/08
[52] U.S. Cl. ................. 123/30 D; 123/32 A; 123/32 B; 123/32 C
[58] Field of Search ................. 123/30 C, 30 D, 32 A, 123/32 B, 32 C, 32 D

[56] References Cited

U.S. PATENT DOCUMENTS

| | | | |
|---|---|---|---|
| 2,828,724 | 4/1958 | Schneider | 123/32 A |
| 2,870,754 | 1/1959 | Morris | 123/32 B |
| 3,083,700 | 4/1963 | Madak et al. | 123/32 A |

FOREIGN PATENT DOCUMENTS

| | | | |
|---|---|---|---|
| 481868 | 8/1929 | Fed. Rep. of Germany | 123/32 B |
| 634353 | 2/1928 | France | 123/32 B |
| 834777 | 12/1938 | France | 123/32 B |
| 1288819 | 2/1962 | France | 123/32 B |
| 337682 | 5/1959 | Switzerland | 123/30 D |
| 1187787 | 4/1970 | United Kingdom | 123/30 C |

Primary Examiner—Tony Argenbright
Attorney, Agent, or Firm—Watson, Cole, Grindle & Watson

[57] ABSTRACT

A compression ignition direct injection internal combustion engine comprising at least each one cylinder, a piston and an injection nozzle, the cylinder having an inlet port for inducing rotation of the incoming air about the axis of the cylinder and a combustion chamber or cavity in the form of a body of rotation disposed in the piston, said chamber having, below the crown of the piston, a constriction which divides the chamber into an upper and a lower part.

18 Claims, 8 Drawing Figures

COMPRESSION IGNITION DIRECT INJECTION INTERNAL COMBUSTION ENGINE

BACKGROUND OF THE INVENTION

The invention relates to a compression ignition direct injection internal combustion engine with an inlet port for inducing rotation of the incoming air about the axis of the cylinder and a combustion chamber or cavity having the shape of a body of rotation and disposed in the piston and accepting, at the end of the compression stroke, almost all the combustion air. This chamber comprises, below the crown of the piston, a constriction that divides it into an upper and a lower portion, and an injection nozzle with its tip arranged substantially on the axis of the combustion chamber. The jets of fuel from the nozzle are directed against the wall of the chamber, and the geometrical point of intersection of the axes of the injection nozzle holes lying below the minimum cross section of the constriction of the combustion chamber or cavity throughout the injection period.

DESCRIPTION OF THE PRIOR ART

From Swiss Patent Specification No. 211,350 there is known an internal combustion engine of the kind described above in which the part of the chamber that lies above the constriction is formed by a cone having a very large apex angle. This flat construction is aimed at preventing damage to the engine as a consequence of thermal bulging distortion of the crown of the piston towards the cylinder head and consequent contact between the piston and the cylinder head, and in addition to reduce the radial velocity of entry of the air into the chamber as the piston is rising, in order not to upset the rotation of the air flow induced by the masked inlet valve. The slow and steady divergence of the upper part of the combustion chamber towards the periphery of the piston causes, in this known arrangement, an almost constant delay in the entry of the air with the disadvantage of low turbulence. This results in a relatively rapid partial "freezing in", i.e. a premature interruption of the combustion as the burning mixture spills over from the lower part of the chamber into the upper part on downward movement of the piston. Tests have shown that this known engine has relatively high quantities of soot and a high proportion of unburnt hydrocarbons in the exhaust gas. These drawbacks, the avoidance of which is of increasing significance mainly in the light of the efforts towards achieving pure exhaust gases, arise in particular to an increased extent when, on grounds of economy and in order to obtain lower emission values, the engine is to be operated with a very high compression ratio, and also in engines which are to run at high speeds and with a relatively late start to the injection process. The known engine, originating from the period before 1940 and accordingly still running relatively slowly, has a constriction in the combustion chamber of which the smallest diameter is about 60% of the maximum diameter of the chamber. This marked constriction and the resulting loss of power as a consequence of throttling or transfer losses is a substantial drawback in particular in the more modern high speed engines of the kind described, as the above-mentioned throttling losses increase with the square of the speed.

SUMMARY OF THE INVENTION

The invention is based on solving the problem of avoiding the drawbacks of the engine of the kind described in the introduction, and of providing an adequate solution for the formation of the mixture even in high speed diesel engines having cylinders of small dimensions.

According to the invention this problem is solved in that the diameter of the narrowest cross-section of the chamber separating the upper part from the lower part is about 75 to 90% of the maximum diameter of the chamber and that the upper part of the chamber lying between the plane of the minimum cross-section and the plane of the crown of the piston represents a volume of about 10 to 30% of the overall volume of the chamber.

Unexpectedly this makes possible a very marked reduction in the fuel consumption and in the emission of unburnt hydrocarbons and soot. Even at unusually high compression ratios only a relatively small quantity of soot was measured in the exhaust gas.

The explanation for this may lie in an improvement, achieved by the invention, in the formation of the mixture an in the course of the combustion process and in reduced throttling losses. By the super-position, onto the rotating horizontal flow of the induced air, of the flow, almost perpendicular to it, by the displacement of the air into the chamber there is apparently obtained an intensive turbulence, the constriction causing a turbulence-inducing increase in the speed of the flow during transfer. This results in a rapidly occuring exceptionally effective mixture formation and as a further consequence a substantially more favourable combustion process. Apparently on account of the high velocity of entry of the air into the upper part of the chamber and as a consequence of the sudden widening below the minimum cross-section a strongly turbulent layer is formed above the cross-section that separates the two parts of the chamber, supporting rapid and complete after-burning of the mixture that flows out of the chamber after ignition and the premature "freezing in" of the combustion by cooling in the narrow piston clearance is avoided. The advantages of the invention arise particularly with a relatively late start to the injection process, which must be employed for the reason of reducing nitrous oxides, at very high compression ratios, and in engines running at very high speeds.

A particularly favourable form of the transfer flow is obtained if, according to a further feature of the invention, the angle of the flanks of the constriction determined by the tangent to the bounding surface of the lower part of the chamber at the geometric intersecting circle of the upper and lower part of the body of rotation that forms the combustion chamber on the one hand, and by the generator of the cone drawn through the circle of intersection of the two parts of the body of rotation and the circle of intersection of the upper part of the body with the crown of the piston on the other hand, lies between 70 and 120°. This makes it possible to obtain a further improvement in the advantages achieved by the invention, in particular low emission values.

Unexpectedly still more favourable emission values are obtained if, according to a further embodiment of the invention, the side wall of the lower part of the chamber is formed at least partially by a cylinder which is parallel to the axis of the piston. In fact this achieves the result that the jets of fuel, at least during the greater part of the injection period, also with a necessary delay of the start of the injection e.g. in accordance with speed, strike the side walls at the same angle so that in this regard similar conditions for the formation of the mixture prevail throughout.

It is also of advantage if, according to a further embodiment of the invention, the diameter of the narrowest cross-section of the cumbustion chamber is 75 to 90, preferably about 85% of the maximum diameter of the chamber and its distance from the upper face of the piston is 10 to 30, preferably about 20% of the maximum depth of the chamber and if the constriction is formed from two concentric conical surfaces lying at an angle to one another of about 90°. As well as the advantage of the possibility of easy manufacture of the constriction the advantages according to the invention are at the same time further improved.

According to a further feature of the invention it can be provided that the edges of the constriction in the region of the geometrical circle of intersection of the two parts of the body of rotation and/or the circle of intersection with the plane of the crown of the piston are rounded off, that is to say, that the transition of the conical surfaces into one another and/or of the upper conical surface into the crown of the piston is rounded off. The rounding off of the especially exposed and thermally severely loaded edges allows good thermal resistance of this part of the chamber without encroaching upon the stated functional results.

According to the invention it can also be provided that in the region of the circle of intersection of the two bodies of rotation, that is to say, between the two conical surfaces, there is provided a small cylindrical surface, again giving the piston a high thermal resistance but with favourable flow characteristics.

In a further embodiment of the invention it can be provided that at least part of the floor of the combustion chamber is flat, the transition between the side wall and the flat part of the floor being rounded off or, according to a further feature, at least part of the floor of the chamber can, in a manner known in itself, be conical, with the apex towards the crown of the piston and lying on the axis of the chamber. In this way, in addition to the above-mentioned advantages of the invention, there is obtained a desirable reversal or diversion of the flow and, associated with it, improved inter-mixing of the air and the fuel, resulting in a further improvement in the course of the combustion process. This effect can be optimised by careful selection or dimensioning of the cone of the chamber with regard to its apex angle and its height, in relation to the one which the jets of fuel form, in that, according to a further feature of the invention, the cone angle of the cone in the chamber is made equal to or smaller than the cone angle of a cone drawn through the axes of the holes of the injection nozzle, the height of the cone of the chamber being not more than about 75% of the depth of the chamber.

In a further development of the invention it can be provided that the generators of the cone in the combustion chamber are substantially parallel to the generators of the conical surfaces associated with the lower part of the chamber and forming the constriction, whereby in addition to advantages in the matter of manufacture there is obtained above all a still better guiding of the flow into and out of the chamber. In this respect it has also been found to be advantageous for the base diameter of the cone in the chamber to be about 40% of the maximum diameter of the chamber. By means of the stated measures the advantages achieved by the invention can be further improved, and the stated various constructions for the combustion chamber allow the desired advantages to be achieved even with varying types of engine, sizes of engine and ranges of operation, by appropriate selection of the relevant combustion chamber shape that is best suited.

DESCRIPTION OF THE DRAWINGS

The invention is further explained in conjunction with some embodiments by way of example. In the drawings.

DESCRIPTION OF THE PREFERRED EMBODIMENTS

Figure 1:
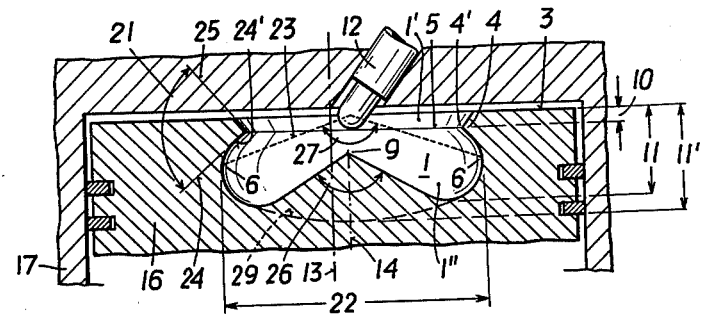
FIG. 1 is a vertical section through the piston and cylinder of an internal combustion engine according to the invention, with the piston at top dead centre.

The piston 16 which moves axially in the cylinder 17 of the engine has a combustion chamber or cavity 1 which is divided by a constriction 4 into an upper part 1' and a lower part 1". Both parts of the chamber are in the form of bodies of rotation, the lower part of the chamber being formed from a torus and the upper part a frustum of a cone, and the axes of the two bodies coinciding. However other shapes of bodies of rotation are possible, for example the upper part of the chamber could be a cylinder or both the lower and also the upper part of the chamber could be ellipsoidal or toroidal bodies of rotation (FIG. 5) or at the transition of the lower part of the chamber into the constriction there could likewise be a cone. The floor of the chamber 1 can be of various forms; FIGS. 1 to 5 show for example in each case the provision of a cone 9 in the chamber 1 or, indicated in broken lines, a downwardly bowed floor 29. In this case the depth of the chamber is indicated at 11'.

Figure 6:
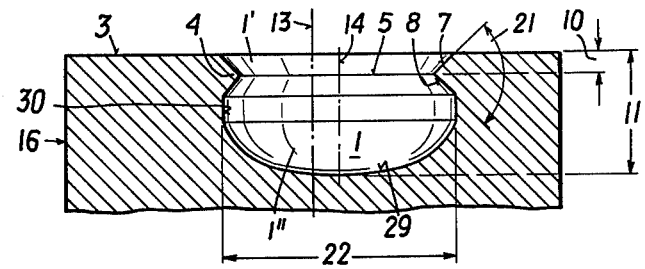
Figure 7:
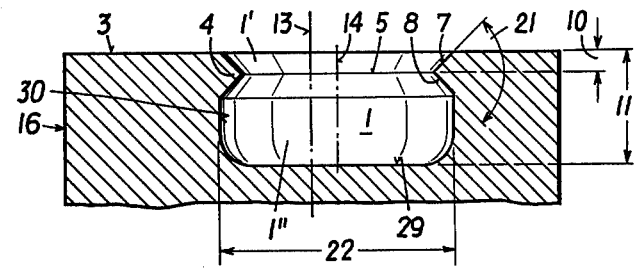
Figure 8:
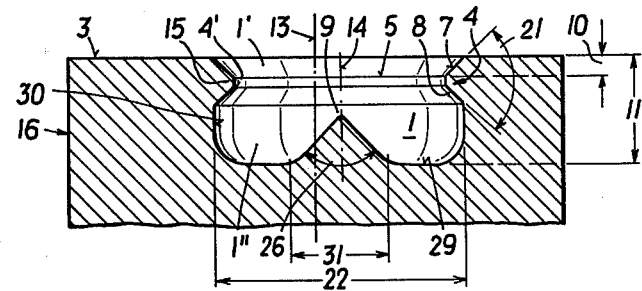

In the chamber shapes shown in FIGS. 6 to 8 a side wall 30 of the lower part 1" of the chamber is cylindrical and the floor of the chamber is bowed downwards (FIG. 6), flat throughout (FIG. 7) or partly flat but with a cone 9 on the axis 14 of the chamber (FIG. 8). The transition between the side wall 30 and the floor 29 of the chamber is in each case well rounded, whereas the transition between the lower conical surface 8 and the constriction 4 is made sharp-edged. In all the embodiments the upper part 1' of the chamber has a volume of about 10 to 30% of the overall volume of the chamber. The distance 10 of the point of smallest diameter 5 from the crown 3 of the piston can likewise be about 10 to 30% of the maximum depth 11 or 11', and the smallest diameter 5 amounts to about 75 to 90% of the maximum diameter 22 of the chamber 1. The maximum diameter 22 of the chamber can lie in the range between about 45 and 65% of the diameter of the piston and the depth 11 of the chamber can lie between about 10 and 25% of the stroke of the piston of the engine.

In FIG. 1 the constriction 4 is formed by the intersection of the cone 25 with the surface 24' of the lower toroidal part 1" of the chamber. The intersection of the upper body of rotation with the lower one defines a circle 4' which, in the case of the embodiment shown in FIG. 1, also gives the narrowest cross-section of the constriction. The edges of the constriction 4 in the region of the circle of intersection 4' and in the region of the circle of intersection of the cone 25 with the crown 3 of the piston could be rounded off.

Figure 4:
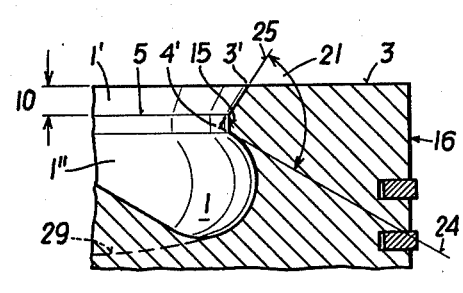
FIG. 4 shows part of the combustion chamber cavity in another embodiment in cross-section.

In the variants illustrated in FIGS. 4 and 8 a small cylindrical surface 15 is provided in the region of the circle of intersection 4'. In this case the minimum cross-section of the constriction is not identical with the circle of intersection 4' of the two bodies of rotation. The volume enclosed by the cylindrical part counts as part of the lower part 1" of the chamber 1.

Figure 5:
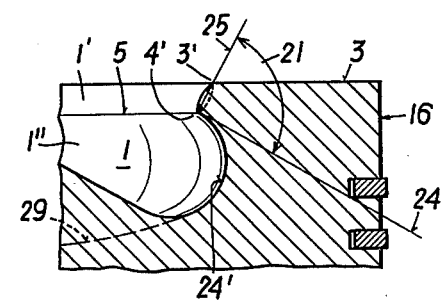
FIG. 5 likewise shows a detail of the combustion chamber in a further embodiment, and FIGS. 6, 7 and 8 each show a section through a further variant of the chamber.

As shown in FIG. 5 other forms are possible for the shape of the constriction. For example the upper body of rotation can be part of a torus and, by appropriate selection of the portion of the torus used, a concave flank of the constriction (indicated in broken lines in FIG. 5) or a convex flank results. The flank angle 21 of the constriction 4 is defined here preferably on the one hand by the tangent 24 to the surface 24' of the lower part of the chamber trough the circle of intersection 4', and on the other hand by generator 25 of the cone which is defined by the circle of intersection 4' of the two bodies of rotation and by the circle of intersection 3' with the plane of the crown 3 of the piston. This flank angle 21 can be made between 70 and 120°.

If the floor of the chamber 1 is provided with a conical raised portion 9 as shown in FIGS. 1 to 5, with its apex directed towards the crown 3 of the piston and lying on the axis 14 of the chamber 1, then advantageously the angle 26 of the cone 9 is made equal to or smaller than the cone angle 27 of the cone that can be drawn through the axes 23 of the holes of the injection nozzle and the height of the cone 9 of the chamber 1 is up to about 75% of the depth 11 of the chamber 1.

In the combustion chamber or cavity shown in FIG. 8 the cone 9 has an apex angle 26 of about 90° and the base diameter 31 of the cone 9 is about 40% of the maximum diameter 22 of the chamber. As the constriction 4 in this example is formed from two opposed conical surfaces 7 and 8 meeting at an angle of about 90°, the generators of the cone 9 of the chamber 1 and the conical surface 8 of the constriction 4 are parallel to one another.

Figure 2:
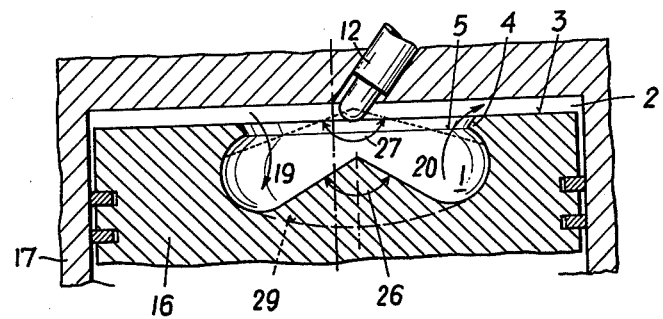
FIG. 2 shows the same section with the piston in the position at the start of the injection process and before top dead centre or in the downward movement after top dead centre.
Figure 3:
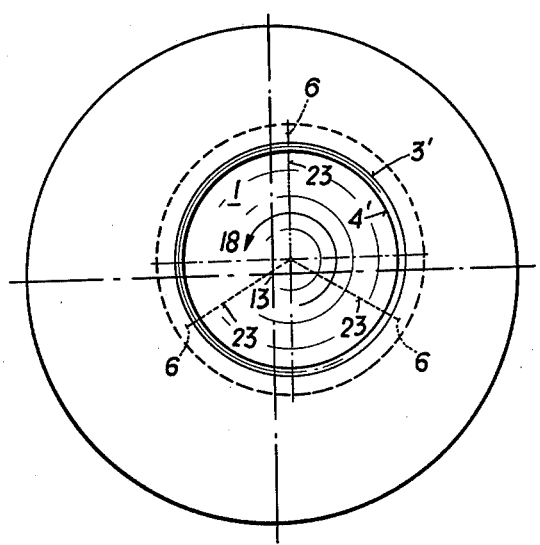
FIG. 3 is a plan view of the piston of FIGS. 1 and 2.

The injection nozzle 12 is arranged with its tip on the axis 14 of the chamber 1 and carries at least three holes lying geometrically on the surface of a cone, not necessarily distributed uniformly around the periphery (FIGS. 1, 2, 3). The jets of fuel delivered by the nozzle 12, indicated by the axes 23 of the holes, have their geometrical point of engagement 6 with the wall of the combustion chamber below the minimum diameter 5 of the constriction 4 during the entire injection period. In FIG. 3 there are illustrated the combustion chamber or cavity 1, off-set somewhat from the axis 13 of the cylinder for design reasons, the distribution of the axes of the jets 23 of fuel and their points of engagement 6.

The course of the formation of the mixture is as follows:

The air which is drawn in is set in rotation in the direction of the arrow 18 (FIG. 3) by an inlet port arranged appropriately for this purpose and this rotation is maintained during the compression phase. As the piston 16 approaches its top dead centre, illustrated on the left-hand side of FIG. 2, the air rotating in the cylinder space 2 is forced through the constriction 4 into the combustion chamber 1 with a marked increase in its velocity in a vertical direction, as indicated by the arrow 19. In this condition of intensive turbulence the fuel is injected in at least three jets 23 against the wall of the chamber 1 below the smallest diameter 5 of the constriction 4, and in a short time it is very finely and uniformly distributed in the air. The construction of the constriction 4 that is described, as well as the floor of the chamber, if desired in the form of a cone 9, support the mixture-forming process so that after only a short ignition delay in a further sequence there occurs a combustion process which is very good with regard to power, consumption and exhaust gas quality. As the injection begins only a few crankshaft degrees before top centre in low emission small vehicle engines, the injection nozzle penetrates very deeply into the cavity 1. Accordingly almost the entire quantity injected penetrates directly on injection into the lower part 1" of the chamber 1. Following ignition the burning mixture is forced into the upper part 1' of the chamber 1 (indicated by the arrow 20 in the righthand half of FIG. 2) and there it is mixed with the markedly turbulent layer of relatively pure combustion air, resulting in rapid and complete combustion of the charge.

We claim:

1. A compression ignition direct injection internal combustion engine comprising at least each one cylinder, a piston and an injection nozzle, the cylinder having an inlet port for inducing rotation of the incoming air about the axis of the cylinder and a combustion chamber or cavity in the form of a body of rotation disposed in the piston and receiving almost the entire quantity of combustion air at the end of the compression stroke, said chamber having, below the crown of the piston, a constriction which divides the chamber into an upper and a lower part, said injection nozzle being mounted with the nozzle tip substantially on the axis of the chamber and with its fuel jets being directed towards the wall of the chamber, the geometrical points of intersection of the axes of the injection nozzle holes lying below the narrowest cross-section of the constriction in the chamber throughout the entire injection period, the diameter of the narrowest cross-section of the chamber dividing the upper part from the lower part of the chamber measuring about 75 to 90% of the maximum diameter of the chamber, and the upper part of the chamber lying between the plane of the narrowest cross-section and the plane of the crown of the piston having a volume of about 10 to 30% of the overall volume of the combustion chamber, the engine operating at an unusually high compression ratio whereby fuel consumption by the engine and engine exhaust of unburnt hydrocarbons and soot are markedly reduced.

2. An engine according to claim 1 the flank angle of the constriction determined by the tangent to the periphery of the lower part of the chamber at the geometrical circle of intersection of the bodies of rotation forming the upper and lower parts of the chamber on the one hand, and the generator of the cone drawn through the circle of intersection of the two parts formed by bodies of rotation and the circle of intersection of the upper part of the body of rotation with the crown of the piston on the other hand, measuring between 70 and 120 degrees.

3. An engine according to claim 1 the side wall of the lower part of the chamber being formed at least partially by a cylinder parallel to the axis of the piston.

4. An engine according to claim 2 the diameter of the narrowest cross-section of the chamber being 75 to 90, preferably about 85% of the maximum diameter of the chamber, and its distance from the upper surface of the piston being 10 to 30, preferably about 20% of the maximum depth of the chamber, the constriction being formed from two concentric conical surfaces having an angle between them of about 90 degrees.

5. An engine according to claim 3 the diameter of the narrowest cross-section of the chamber being 75 to 90, preferably about 85% of the maximum diameter of the chamber and its distance from the upper surface of the piston being 10 to 30, preferably about 20% of the maximum depth of the chamber the constriction being formed from two concentric conical surfaces having an angle between them of about 90 degrees.

6. An engine according to claim 2 the edges of the constriction being rounded off in the region of the geometrical circle of intersection of the two body-of-rotation parts and the circle of intersection with the plane of the piston.

7. An engine according to claim 4 the transition of the conical surfaces with one another and of the upper conical surface with the crown of the piston being rounded off.

8. An engine according to claim 2 in the region of the circle of intersection of the two body-of-rotation parts being provided a small cylindrical surface.

9. An engine according to claim 4 a small cylindrical surface being arranged between both conical surfaces.

10. An engine according to claim 1 at least a part of the floor of the combustion chamber or cavity being flat, and the transition between the side wall and the flat part of the floor of the chamber being rounded off.

11. An engine according to claim 4 at least a part of the floor of the combustion chamber or cavity being flat, and the transition between the side wall and the flat part of the floor of the chamber being rounded off.

12. An engine according to claim 1 at least part of the floor of the combustion chamber being formed as a cone the apex of which extending towards the crown of the piston and lying on the axis of the chamber.

13. An engine according to claim 4 at least part of the floor of the combustion chamber being formed as a cone the apex of which extending towards the crown of the piston and lying on the axis of the chamber.

14. An engine according to claim 12 the cone angle of the cone in the chamber being made equal to or smaller than the cone angle of a cone drawn through the axes of the injection nozzle holes, the height of the cone of the chamber being not more than about 75% of the depth of the chamber.

15. An engine according to claim 14 the generators of the cone in the combustion chamber being substantially parallel to the generators of the conical surface forming the constriction and being associated with the lower part of the cavity.

16. An engine according to claim 13 the generators of the cone in the combustion chamber being substantially parallel to the generators of the conical surface forming the constrictions and being associated with the lower part of the cavity.

17. An engine according to claim 16 the base diameter of the cone in the combustion chamber being about 40% of the maximum diameter of the chamber.

18. A compression ignition direct injection internal combustion engine comprising at least each one cylinder, a piston and an injection nozzle, the cylinder having an inlet port for inducing rotation of the incoming air about the axis of the cylinder and a combustion chamber or cavity in the form of a body of rotation disposed in the piston and receiving almost the entire quantity of combustion air at the end of the compression stroke, said chamber having, below the crown of the piston, a constriction which divides the chamber into an upper and a lower part, said injection nozzle being mounted with the nozzle tip substantially on the axis of the chamber and with its fuel jets being directed towards the wall of the chamber, the geometrical points of intersection of the axes of the injection nozzle holes lying below the narrowest cross-section of the constriction in the chamber throughout the entire injection period, the diameter of the narrowest cross-section of the chamber dividing the upper part from the lower part of the chamber measuring about 75 to 90% of the maximum diameter of the chamber, and the upper part of the chamber lying between the plane of the narrowest cross-section and the plane of the crown of the piston having a volume of about 10 to 30% of the overall volume of the combustion chamber.

* * * * *